Feb. 17, 1959 L. P. DUNCAN ET AL 2,873,723
VACUUM BULK MILK TANK WITH AGITATORS
Filed April 26, 1957 2 Sheets-Sheet 1

Inventors.
Lloyd P. Duncan.
Leon Duncan.
George R. Duncan, Sr.
BY
Mason & Mason
Attorneys.

Feb. 17, 1959    L. P. DUNCAN ET AL    2,873,723
VACUUM BULK MILK TANK WITH AGITATORS
Filed April 26, 1957    2 Sheets-Sheet 2

Inventors.
Lloyd P. Duncan.
Leon Duncan.
George R. Duncan, Sr.
BY
Mason & Mason
Attorneys.

United States Patent Office 2,873,723
Patented Feb. 17, 1959

2,873,723

VACUUM BULK MILK TANK WITH AGITATORS

Lloyd P. Duncan, Leon L. Duncan, and George R. Duncan, Sr., Washington, Mo., assignors to Zero Manufacturing Company, Washington, Mo., a company of Missouri Application April 26, 1957, Serial No. 655,224

13 Claims. (Cl. 119—14.18)

This invention relates to a means and method for milking cows, and the automatic washing of the interior of a vacuum bulk milk tank provided with means for milking directly from the cows into the milk tank.

An object of the invention, therefore, is to provide a means and method for milking cows and for washing a bulk milk tank while simultaneously maintaining a partial vacuum on the interior of the tank.

A further object is the provision of an automatic release means for releasing the wash water after the washing operation has been completed, or during the several stages of the washing operation.

Another object of the invention is to provide agitator means including a scoop which is adapted to run in at least two speeds.

A further object is to provide means whereby the agitator means will splatter liquid in all directions in the tank.

A further object is to provide agitator means which will cause little if any damage to the milk being agitated.

An additional object is to provide agitator means which thoroughly splatters the liquid within the tank to effect the satisfactory washing thereof.

Another object is to provide agitator means located near the bottom of the tank which by a screw action forces the liquid upward, the speed thereof being governed whereby a plurality of speeds may be attained.

An additional object is to provide agitator means of the type which will be approved by local, state and Federal milk sanitation agencies.

A further object is to provide a source of vacuum for milking and filling the bulk tank, and for applying vacuum during washing.

Other objects will appear hereinafter throughout the specification.

Figure 2:
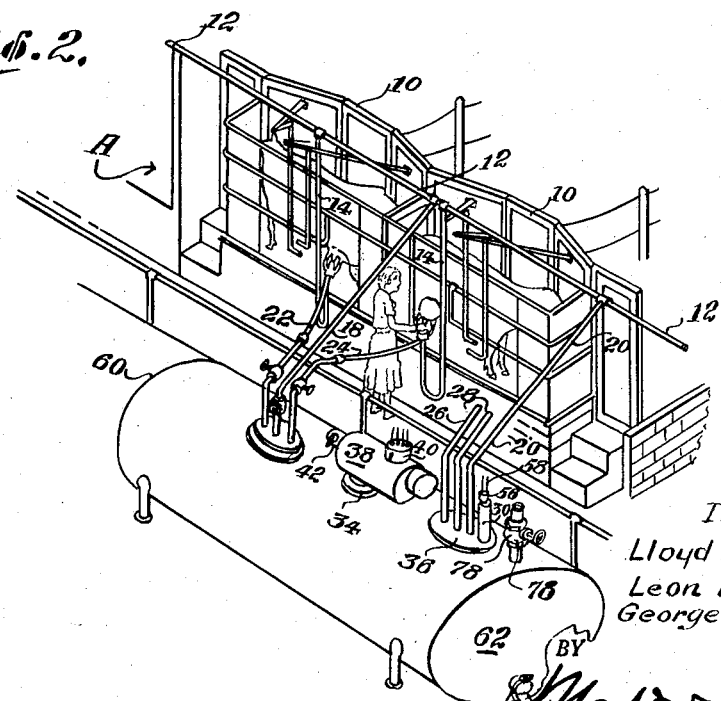
Figure 2 is a perspective view of a portion of the milking parlor with pipe connections to the bulk tank.

Referring now to the drawings A (Figure 2) indicates a milking parlor and B (Figure 2) shows a bulk milk tank located in said milk parlor.

The milk parlor has a stall construction 10 for a plurality of animals, two being illustrated. Extending longitudinally of the milk parlor is a vacuum line 12 from a milking means, not shown, said line having branch lines 14 leading to the sets of teat cups 16.

There has also been illustrated a pair of additional vacuum branch pipes 18 and 20 leading from main line 12 directly to the interior of the bulk milk tank B, but it will be understood that only one of these lines may be provided. Two lines leading to the bulk tank from the main vacuum line being provided in order to allow for quick assembly and disassembly of vacuum lines, milk lines and wash lines, etc. with the milk tank.

As shown the milk lines 22 and 24 lead from the sets of teat cups to the interior of tank 13.

Additionally there has been provided a cold water line 26, hot water line 28 and soap dispenser 30.

Figure 1:
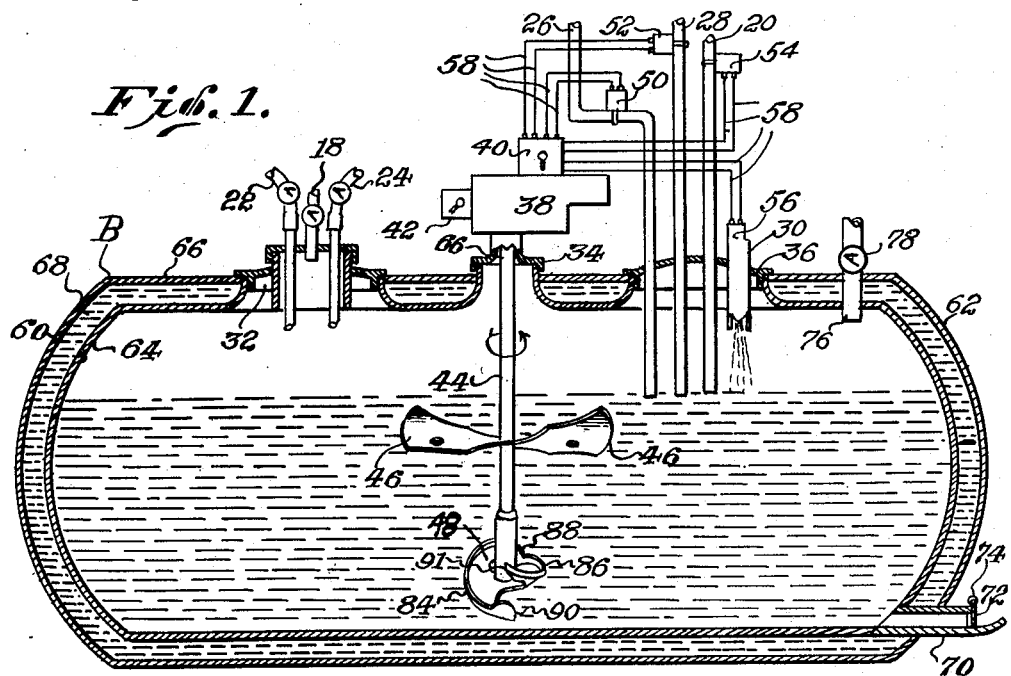
Figure 1 is a vertical section of the bulk tank, with the washing apparatus parts and other parts shown in full lines.

As shown particularly in Figure 1 the tank is of generally cylindrical shape, although the shape of the tank forms no part of the present invention. On the upper portion or top are the removable covers 32, 34 and 36 are provided. Cover 32 supports the milk lines 22 and 24 and vacuum line 18.

Cover 34 supports electric motor 38 and the timer 40 mounted thereon. A rheostat or other type of switch 42 is mounted on the motor for turning on or turning off the motor and for regulating the speed thereof.

Preferably directly connected so as to be driven by the electric motor, is a shaft 44 having a main stirrer 46 located substantially medially of the ends and the top and bottom portions of the tank. Adjacent the lower end of the tank is a smaller stirrer 48. This stirrer as shown is located somewhat closely adjacent to the bottom of the tank for the purpose of agitating continuously the heavier portions of the milk during and after the milk operation; and also after the tank has been drained of milk, and the washing solution has been forced into the tank, this stirrer 48 mixes the heavier portions of the cleansing mixture including undissolved soap particles with the lighter portions of the solution, in a continuous operation.

Pipes or conduits 26, 28, 20 and soap dispenser 30 are provided with solenoid actuated valves 50, 52, 54, 56 connected by suitable wiring 58.

The scoop is a spatter scoop above 300 R. P. M. At approximately 36 R. P. M. it is a refrigeration milk agitator. At approximately 90 R. P. M. it is a butterfat test agitator.

As indicated the tank may be provided with semispherical ends 60 and 62. The tank is of the dual wall type, the inner wall being shown at 64 and the outer wall at 66. A cooling medium such as water 68, is continuously circulated between the walls of the casings, at least during the milking operation and during milk storage by a refrigerating means, not shown. The inner wall may be sprayed, or a cooling coil may be used, in substitution of either of the foregoing cooling means. Such cooling constructions may be used as shown in any of the George R. Duncan Patents Nos. 2,740,378; 2,763,-240; 2,739,568, or Reissue Patent 24,162.

As shown in both figures an outlet conduit from the inner casing is shown at 70. Any suitable type of valve may be used such as a rotary plug valve, not shown, but the vacuum release valve 72 pivoted at 74, shown in Figure 1, is preferred. This valve will remain closed as long as a minus pressure is maintained in the inner casing 64.

It will be understood that covers 32, 34 and 36, as well as the connections of the conduits 18, 20, 22, 24, 26, 28 and 30 to these covers are sealed connections, so as to prevent the breaking of the vacuum within casing 64. Additionally the shaft 44 is sealed at 66, where it passes through the cover. A pipe 76 has valve 78 that may be manually operated to break the vacuum in tank casing 64.

Figure 3:
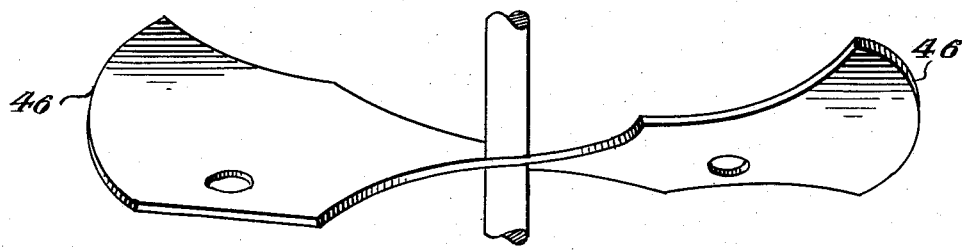
Figure 3 is a perspective view of the stirrer.
Figure 4:
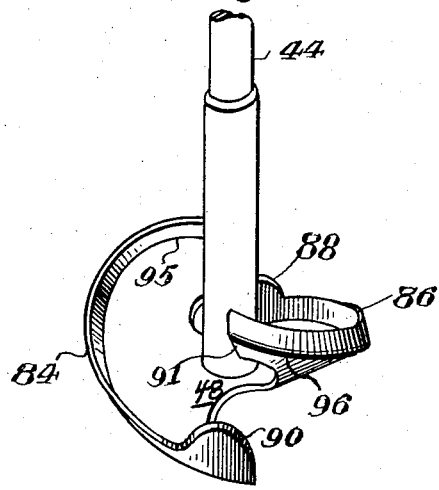
Figure 4 is a top plan view of the lower portion of the stirrer with the shaft shown in section.
Figure 5:
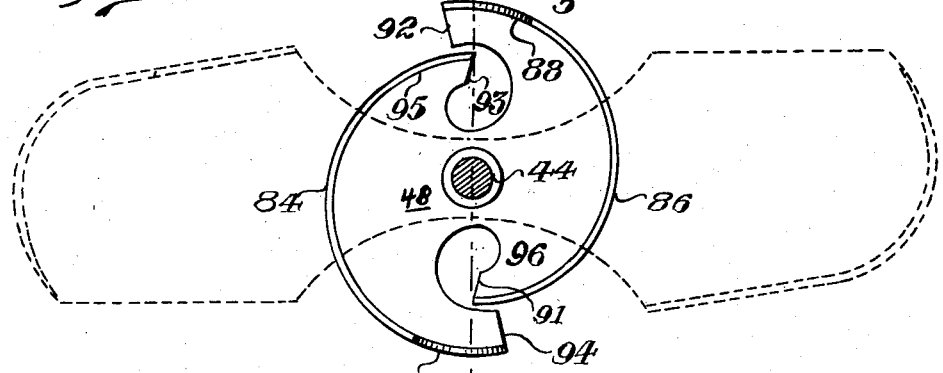
Figure 5 is a section taken on the line 5—5 of Figure 4.
Figure 5:
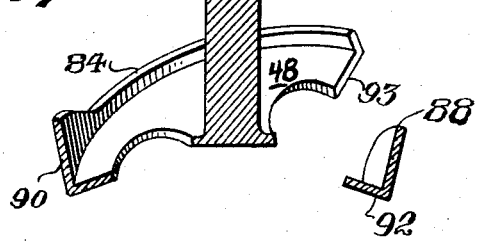

Referring to Figures 3, 4 and 5, the lower end of the shaft 44 has attached to it the smaller stirrer 48 as noted above. This stirrer blade has advancing edges 92 and 94 adjacent to which are the elevated advancing portions 88 and 90, respectively. Extending in a somewhat circular direction from said elevated portions are the rims 84 and 86, respectively. The trailing edges are shown at 93 and 91 respectively and these, it will be noted, are located more closely adjacent the shaft than the advancing edges 92 and 94.

By reference to Figures 1, 3 and 5, it will be seen that the blades form sections of spirals with the advancing edges and surfaces lying adjacent thereto being lower than the trailing edges and their adjacent surfaces. This structure when rapidly rotated during the washing operation causes the liquid in the tank to be forced into all corners of the milk tank, such as where ends 60 and 62 are connected to the cylindrical portion 66 of the tank.

It will be understood that the milk may be poured into the tank from cans or other containers instead of being led through the milk conduits from the milking apparatus to the tank. It will be further understood that manual means, not shown, may be provided to drive the agitator at a plurality of speeds. This agitator will cause the liquid, whether milk or washing fluid, to splatter the entire inside of the tank. This action more properly applies to the washing of the tank, whereas milk is only stirred in a manner to thoroughly mix the milk in the tank and ensure that the temperature of all the milk is the same.

Operation

Assuming the tank has been entirely cleaned, and further assuming that each of the milk and vacuum conduits 18, 22 and 24 is provided with a hand operated valve, the operation starts when the cows are milked in the usual manner by means of the vacuum line 12 which is connected to a suitable milking machine, not shown. The milking operation progresses by replacing the milked cows in the stall construction with fresh cows until all the cows have been milked. During this time the milk is continuously gently agitated or stirred by the paddles or stirrers 46 and 48, the speed of the stirrers being controlled by rheostat switch 42. During this time all of the solenoid valves except valve 20 have been kept closed by the timer 40.

Following the milking operation valves 18, 22 and 24 are closed and timer actuated vacuum valve 20 is closed by said timer, and valve 78 in pipe 76 is opened to break the vacuum. This permits release of the milk through valve 72. The timer is operated to open valve 20 and the valve 18 is opened manually, and valve 78 is closed.

As the timer continues to operate hot water enters the tank through pipe 28, valve 56 being concurrently opened to admit soap, preferably in liquid form. Suction from pipes 18 and 20 has previously closed valve 72, and during the time the wash water and soap is admitted, the paddles operate to stir the contents.

The vacuum is now released by closing pipes 18 and 20 and opening valves 78 and 72. The valves are now closed and valves 18 and 20 opened to admit wash water through pipe 26, following which valves 18 and 20 are closed and valves 78 and 72 opened to permit the draining of the wash water.

The above description and drawings disclose one embodiment of the invention, and specific language has been employed in describing the several figures. It will, nevertheless, be understood that no limitations of the scope of the invention is thereby contemplated, and that various alternations and modifications may be made such as would occur to one skilled in the art to which the invention pertains.

I claim:

1. A milking system for milking a farm animal comprising a set of teat cups, a bulk milk cooler tank, a milk conduit interconnecting said teat cups with said cooler tank, a vacuum conduit operatively connected to said cooler tank, stirrer means in said cooler tank, variable speed power means operatively connected to said stirrer means, said stirrer means comprising a substantially vertically disposed shaft and propeller-type paddles on said shaft, whereby when said shaft is turned at slow speed, the milk will be agitated and when cleaning fluid is introduced to said tank and said shaft rotated at high speed, the said tank will be cleaned.

2. A milking system as claimed in 1 wherein said variable speed power means consists of variable speed electric motor with a timer operatively connected therewith.

3. A milking system as claimed in claim 1 having a soap dispenser means leading into said bulk milk cooler tank.

4. A milking system as claimed in 1 wherein said shaft may be turned at approximately 36 R. P. M. as a refrigeration milk agitator, at approximately 90 R. P. M. as a butterfat test agitator, and in excess of 300 R. P. M. for tank cleaning by said variable speed power means.

5. A milking system as claimed in 1 wherein said cooler tank is substantially cylindrical in shape.

6. A milking system as claimed in 1 wherein said cooler tank has inner and outer walls with refrigeration means disposed between said walls.

7. A milking system as claimed in 1 wherein said cooler tank has leading from substantially its lowermost portion a drain conduit with a one-way valve interconnected therewith which will remain in closed position when the atmospheric pressure outside said cooler tank exceeds the pressure inside said cooler tank.

8. A milking system as claimed in 1 wherein the lower of said propeller-type paddles has at least one blade of spiral shape wherein the lower portion of said blade extends outwardly further from said shaft than the upper portion of said blade, said blade having a rim extending upwardly along its outer portion.

9. A milking system as claimed in 1 wherein the milk conduit interconnecting said teat cups and said cooler tank leads directly from the assembly of said teat cups to said cooler tank.

10. A milking system for milking a farm animal comprising a set of teat cups, a bulk milk cooler tank, a milk conduit operatively connected to said cooler tank, stirrer means in said cooler tank, variable speed power means operatively connected to said stirrer means, said stirrer means comprising at least one substantially vertically disposed shaft with at least two paddle means on said shaft, the lower of said paddle means being a propeller-type paddle whereby when cleaning fluid is introduced into the bottom of said tank and said shaft is rotated at high speed, the said cooler tank will be cleaned, and when said shaft is rotated at slow speed with milk in said cooler tank the milk will be gently agitated.

11. A milking system for milking a farm animal comprising a set of teat cups, a bulk milk cooler tank, a milk conduit means interconnecting said teat cups with said cooler tank, a vacuum conduit operatively connected to said cooler tank, stirrer means in said cooler tank, a variable speed motor operatively connected to said stirrer means, said stirrer means comprising at least one substantially vertical shaft extending from the top to near to the bottom of said cooler tank, at least two propeller-type paddles connected to said shaft, the upper of said paddles being located substantially medially of the top and bottom portions of said cooler tank, the lower of said paddles being smaller than the upper paddle and located on said shaft adjacent the lower portion of said cooler tank, whereby when said shaft is turned at a slow speed milk in said cooler tank will be gently agitated and when the milk is removed and cleaning fluid is introduced into the bottom portion of said cooler tank and said shaft is rotated at high speed, the said cooler tank will be cleaned.

12. A milking system for milking cows and other farm animals comprising a set of teat cups, a bulk milk cooler tank, milk conduit means interconnecting said teat cups and said cooler tank, a vacuum conduit operatively connected to said cooler tank, at least one substantially vertically disposed shaft extending into said cooler tank, variable speed power means operatively connected to the upper portion of said shaft, a main stirrer connected to said shaft substantially medially of the top and bottom portions of said cooler tank, a propeller-type scoop stirrer connected to said shaft substantially adjacent to the inside bottom of said cooler tank, whereby when said shaft is revolved slowly milk in said cooler tank will be gently agitated and with the milk removed and cleaning fluid introduced into said cooler tank and said shaft revolved at a high speed, the said cooler tank will be cleaned.

13. A system for milking a farm animal, for cooling and storing the milk in a bulk receptacle as it comes from the animal, and for cleaning the inside of the bulk receptacle, comprising milking means and first conduit means extending therefrom, a milk cooler having insulating walls, a bulk milk vacuum receptacle in said cooler, said bulk milk receptacle being generally cylindrical in shape and having an opening extending through a wall of said cooler, said first conduit means extending into the interior of said bulk milk receptacle, means for cooling said receptacle during the milking operation, a second conduit means, said second conduit means extending into said receptacle whereby to maintain a pressure in said bulk milk receptacle lower than atmospheric pressure during the milking operation, stirrer means in said bulk milk receptacle, variable speed power means operatively connected to said stirrer means, said stirrer means comprising at least one substantially vertically disposed shaft and propeller-type paddles on said shaft, the lowermost of said paddles being adjacent the bottom of said bulk milk receptacle, said stirrer means functioning as cleaning means when revolved at high speed with cleaning fluid introduced into the bottom of said bulk milk receptacle.

References Cited in the file of this patent

UNITED STATES PATENTS

| | | |
|---|---|---|
| 2,616,809 | Graves | Nov. 4, 1952 |
| 2,674,979 | Merritt et al. | Apr. 13, 1954 |
| 2,730,992 | Kessler | Jan. 17, 1956 |
| 2,739,568 | Duncan | Mar. 27, 1956 |